United States Patent

[11] 3,616,460

[72] Inventors Frederick D. Watson;
Weldon D. Mayse, both of Houston, Tex.
[21] Appl. No. 27,019
[22] Filed Apr. 9, 1970
[45] Patented Oct. 26, 1971
[73] Assignee Petrolite Corporation
St. Louis, Mo.

[54] ELECTRIC COALESCER
9 Claims, 3 Drawing Figs.
[52] U.S. Cl. .................................................. 204/302,
204/188
[51] Int. Cl. .................................................. B03c 5/02
[50] Field of Search .................................. 204/188-191,
302-308; 208/187

[56] References Cited
UNITED STATES PATENTS
| | | | |
|---|---|---|---|
| 1,565,992 | 12/1925 | Eddy | 204/188 |
| 1,796,750 | 3/1931 | Eddy | 204/188 |
| 2,116,509 | 5/1938 | Cottrell | 204/188 |
| 2,929,770 | 3/1960 | Wennerberg | 204/308 |
| 3,415,738 | 12/1968 | Nicodimescus | 208/187 |

Primary Examiner—John H. Mack
Assistant Examiner—Neil A. Kaplan
Attorneys—Emil J. Bednar and Sidney B. Ring ABSTRACT: An electric coalescer for removing aqueous liquid droplets dispersed in a hydrocarbon distillate by passage serially through a pretreatment cell having a unidirectional electric field with a gradient in the range from about 20 to about 60 kilovolts per inch between spaced apart electrodes and a container mounting a water-wetted porous material. The porous material, preferably stainless steel wool, provides a residence time to the hydrocarbon distillate of at least about 4 minutes. The electric field gradient is adjusted relative to the mass of porous material so that the liquid droplets coalesce in the porous material to a predetermined degree from the hydrocarbon distillate. A loose mixture of the coalesced liquid droplet phase in the continuous hydrocarbon distillate phase passes from the porous material. A phase separator resolves the loose mixture into a stream of dry hydrocarbon distillate and a second stream comprising the coalesced liquid droplets.

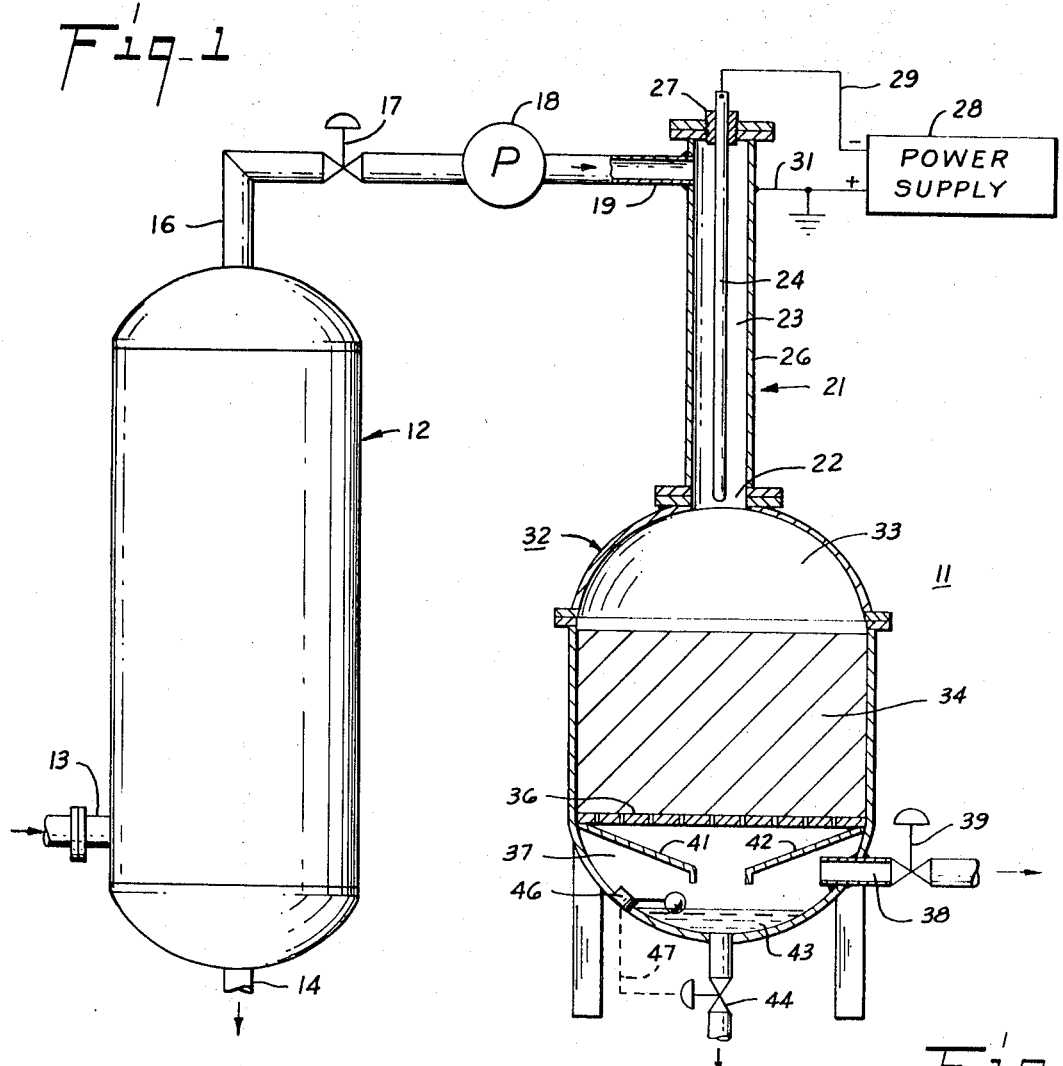
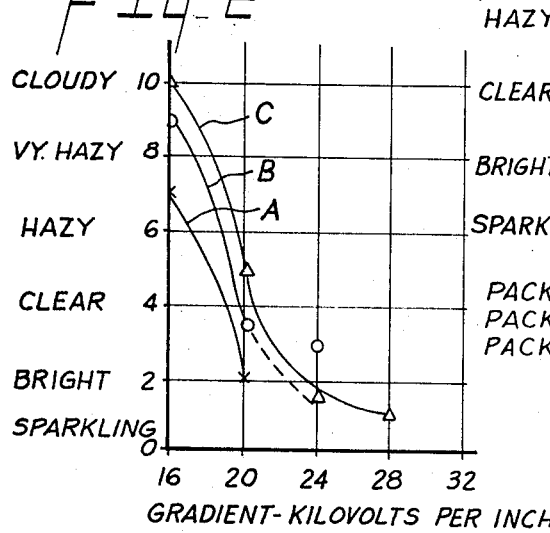
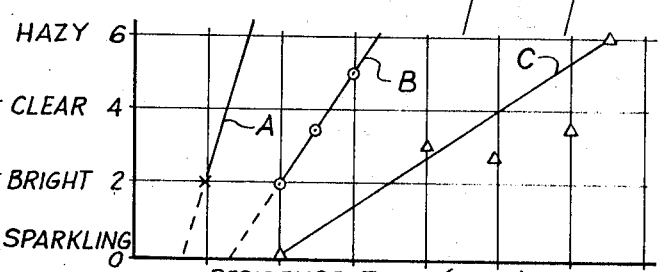
FREDERICK D. WATSON
WELDON D. MAYSE
INVENTORS.
BY
Emil J. Bednar
ATTORNEY

ELECTRIC COALESCER

BACKGROUND OF THE INVENTION

1. Field of the Invention

This invention relates to the separation of immiscible liquid mixtures, and more particularly, it relates to the removal of dispersed aqueous droplets from hydrocarbons by a combination of electric fields and aqueous coalescing mediums.

2. Description of the Prior Art

There are many occasions where it is desired to separate dispersed water from hydrocarbon distillates. For example, the marketability of heating oils is greatly reduced when they have a hazy appearance produced by substantial amounts of water finely dispersed within the continuous hydrocarbon phase. The dispersed water may be introduced during the initial distillation of the heating oil or in a subsequent processing step. Intimately dispersed water may result where the heating oil is washed with a small amount of dilute caustic for removing acidic material. In other instances, the dispersed water may remain in the hydrocarbon stream as a result of successive acid treatment and caustic neutralization steps.

One of the more common problem areas is a kerosene stream containing large amounts of suspended water introduced during fractionation steps. In many instances, the kerosene stream must be subsequently treated to remove mercaptan compounds in a process termed "sweetening." One sweetening process employs the active agent as a metallic salt, copper chloride. This type of sweetening process requires a feed-stock containing no free or suspended water. If possible, the refiner would prefer that the amount of dispersed water be even less than the amount required to saturate the kerosene at process temperature. Therefore, a salt dryer has been used to dry the kerosene feed-stock to remove all free and some soluble water. Unfortunately, the water content of many of the kerosene feed-stocks has averaged about 2,000 parts per million. As a result, frequent shutdowns of the salt dryer are required in order to replenish the supply of available salt for drying purposes.

There are many other examples of hydrocarbon distillates containing undesired amounts of water, which water is predominantly in suspension but to some extent may be soluble in the hydrocarbon phase. Certain types of electrical precipitators can reduce the amount of water suspended within hydrocarbons and reference may be taken to U.S. Pat. No. 3,342,720 as one example. Although such equipment significantly reduces the amount of water suspended within a hydrocarbon distillate, some process steps require a further reduction of the water content to a predetermined degree approaching the solubility of water in the distillate. Various types of filter-dryers have been proposed and tried to remove water from liquid hydrocarbons. However, these filters do not have the flexibility to provide a dry hydrocarbon distillate when the incoming stream varies greatly in its water content. Additionally, these filters function acceptably only at relatively low rates of throughput. Filters have been placed downstream of electric precipitators in an attempt to reduce the water content of a hydrocarbon stream. However, this arrangement has not provided entirely acceptable results since the electric precipitator continues to function without any correlation to the characteristics of the filter. It is the object of the present invention to combine in a certain coaction the electric field in agglomerating suspended water droplets with the ability of a properly designed filter in the coalescence of water droplets so as to produce a substantially dry hydrocarbon distillate from which the water droplets have been removed to a predetermined degree.

SUMMARY OF THE INVENTION

In accordance with this invention, there is provided a coalescer for removing aqueous liquid droplets dispersed in a hydrocarbon distillate. Included is a pretreatment cell with electrodes receiving an applied potential for creating an electrical field within their interelectrode space. An upper inlet and a lower outlet provide for moving fluids through the interelectrode space. Field establishing means maintain a high voltage, unidirectional electric field with a gradient in excess of about 20 kilovolts per inch in the interelectrode space. A first means continuously delivers to the inlet of the pretreatment cell a stream of the wet hydrocarbon distillate at a rate of flow sufficient to prevent accumulation of the dispersed droplets in the interelectrode space. The pretreatment cell integrally connects to a container having an upper inlet zone, an intermediate zone containing a porous material preferentially water wetted, and an outlet zone. The pretreatment cell delivers downwardly all fluids therefrom directly into the upper inlet zone. The mass of the porous material in the container provides a residence time to the hydrocarbon distillate sufficient to coact with said pretreatment cell to separate by coalescence the liquid droplets from the hydrocarbon distillate and then discharge into the outlet zone a loose mixture of the continuous hydrocarbon distillate phase carrying the coalesced liquid droplet phase. A second means in the outlet zone of the container provides a stream of dry hydrocarbon distillate and a second stream comprising the liquid droplets coalesced from the hydrocarbon distillate in the porous material.

DESCRIPTION OF THE DRAWINGS

FIG. 1 is a prospective view, partially in cross section, of an electric coalescer embodying the present invention arranged to remove dispersed water from a hydrocarbon distillate stream;

FIG. 2 is a graph illustrating the relationship of the gradient in the electric field within the interelectrode space of the coalescer of FIG. 1 relative to the degree of dehazing of a hydrocarbon distillate; and FIG. 3 is a graph illustrating the relationship between the residence time of fluids in the porous material within the coalescer of the FIG. 1 to the degree of dehazing of a hydrocarbon distillate.

DESCRIPTION OF SPECIFIC EMBODIMENTS

Referring now to FIG. 1, there is illustrated an electric coalescer 11 constructed in accordance with the present invention. The coalescer 11 may be formed of any type of a suitable structure but usually will be a steel-walled vessel carrying the usual types of flow controls suitable for performing the desired process steps. The coalescer 11 may be connected downstream of a gravity settler 12 which performs a bulk separation on a water-hydrocarbon distillate mixture by removing certain portions of the entrained water through an outlet 14 and a stream of semiwet hydrocarbon distillate from an outlet 16. The wet hydrocarbon distillate supplied to the electrical coalescer 11 may be obtained from any suitable types of processing equipment in addition to the settler 12.

The distillate passes from the outlet 16 of the settler 12 through a control valve 17 and then is moved by a pump 18, at a desired flow rate, into the electric coalescer 11. The hydrocarbon distillate may be of any composition not highly electrically conductive but usually will be provided by refinery processes from petroleum and with an endpoint in its distillation range of below about 700° F. The hydrocarbon distillate may contain variable amounts of entrained water in addition to the small amounts of water soluble in the distillate at the temperature and pressure residing in the settler 12. For example, the hydrocarbon distillate may contain several thousand parts per million total water, and possibly 200 parts per million of dissolved water. Obviously, wet hydrocarbon distillate streams of this nature cause a rapid expenditure of a drying medium such as salt, attapulgus clay, or similar other types of drying materials. The water dispersed in the hydrocarbon may be of any nature including weakly acidic or caustic solutions, brines or any other type of aqueous liquid as will be apparent to those skilled in the art. These various waters and aqueous solutions are encompassed within the terminology "aqueous liquid" as this term is used herein.

The hydrocarbon distillate is forced by the pump 18 into an inlet 19 of the pretreatment cell 21 formed integrally within the coalescer 11. The pretreatment cell 21 has a lower outlet 22 and spaced apart electrodes which define an interelectrode space 23. The interelectrode space 23 may be formed by any suitable electrode constructions. Preferably, the electrodes take the form of a metallic rod 24 mounted coaxially within a metallic cylindrical body 26 of the pretreatment cell 21. The rod 24 is mounted in the upper extremity of the body 26 by an insulating bushing 27. Thus, an energizing potential can be applied between the electrodes formed by the rod 24 and body 26 to create an electric field in the interelectrode space 23. A power supply 28 is connected to these electrodes for maintaining a high voltage, unidirectional electric field in the interelectrode space 23. For example, the power supply 28 may be of any suitable form for applying a highpotential, DC voltage between the rod 24 and the body 26. Usually, the negative terminal of the power supply 28 is connected by a conductor 29 to the rod 24. Additionally, the positive terminal is connected by a conductor 31 to the body 26 and to earth-ground for safety purposes. The power supply 28 should produce a high voltage, unidirectional electric field in the interelectrode space 23 wherein the gradient is in excess of about 20 kilovolts per inch. The power supply 28, for optimum utility in the present electrical coalescer 11, will be adjustable so that the gradient in the interelectrode space 23 is regulated within the range from about 20 to about 60 kilovolts per inch. Lesser gradients than 20 kilovolts per inch do not provide advantageous results in operation of the coalescer 11. Moreover, gradients above 60 kilovolts per inch usually will be found undesirable in that they are capable in some instances of increasing the degree of dispersion of the water in the hydrocarbon distillate to such a degree that the overall performance of the coalescer 11 may begin to degrade.

The pretreatment cell 21 is connected integrally to a container 32 forming the lower portion of the coalescer 11. For this purpose, the lower end of the body 26 and the upper end of the container 32 contain flanges by which a bolted interconnection is made between these components of the coalescer 11. Other means of securing the pretreatment cell to the container 32 may be used if desired. In a preferred embodiment, the pretreatment cell 21 is formed with the rod 24 (steel) having a diameter of approximately 1 inch and a length of approximately 3 feet. The body 26 (steel) has an internal diameter such that there is a one inch annulus surrounding the rod 24 within the body 36. Thus, the interelectrode space 23 is the one inch annulus between the rod 24 and the body 26. Usually, the rod 24 and the body 26 will have such dimensions that the ratio of the length of the rod 24 to its spacing from the body 26 will be in the range of not less than 8:1. Although the particular electrode dimensions within the pretreatment cell 21 are not critical, good results have been obtained with the preferred construction which has been described.

The pump 18 provides a flow of the hydrocarbon distillate into the inlet 19 at a rate of flow sufficient to prevent accumulation of the dispersed liquid droplets separated from the hydrocarbon distillate in the interelectrode space 23. Generally, a linear velocity within the pretreatment cell 21 of about 4 inches per second or greater is sufficient. As the gradient of the electric field within the interelectrode space is increased, it becomes desirable to increase the rate of flow of fluid through the pretreatment cell 21 to such a magnitude as to prevent short-circuiting conditions in the interelectrode space 23. Usually, the preferred range for rate of flow through the interelectrode space 23 will be in the range of about 4 to about 100 inches per second. Obviously, the maximum voltage gradient to be employed will depend upon the electrical characteristics of the hydrocarbon distillate and the electrical parameters of the pretreatment cell 21.

The outlet 22 of the pretreatment cell 21 delivers downwardly all fluids therefrom directly into an upper inlet zone 33 of the container 32. The fluids pass from the upper inlet zone 33 into an intermediate zOne containing a bed of porous material 34. The rod 24 and porous material 34 should be spaced apart a sufficient distance that any electric field therebetween has a gradient insufficient to effect adversely (as by redispersing the liquid droplets) the pretreated hydrocarbon distillate. For example, a gradient of about 10 kilovolts per inch or less are usually satisfactory.

The porous material 34 may be selected from any suitable water-wetted material which is adapted to coalesce water from a hydrocarbon distillate continuous phase. For example, the porous material 34 may be formed of loosely packed particles or chunks of porous, or nonporous, granular material in uniform, or random contact with each other. These materials may be sand, gravel, clay, carbon, coal, etc. The porosity of the individual particles is not critical as long as the composite bed formed of them is porous sufficiently to permit a flow of hydrocarbon distillate therethrough. In addition, unitary beds of the porous material may be used. For example, a filamentary plastic material, such as polyurethane foam, may be used. Alternatively, the porous material 34 may be formed of metallic meshes, wires, and the like. Good results have been obtained with the porous material 34 formed of stainless steel wool. However, other well-known porous materials such as loosely packed masses of glass wool, rock wool, synthetic plastic fibers, etc., may be used for the purposes of coalescing water from the hydrocarbon distillate received from the pretreatment cell 21 into the container 32. Obviously, the porous material 34 is preferentially water-wetted in the presence of hydrocarbons (oils).

The mass of the porous material 34 is sized so as to provide a sufficient residence time to the hydrocarbon distillate that the liquid aqueous droplets are coalesced from the hydrocarbon distillate which had been preconditioned in the pretreatment cell 21. For example, the dimension of the porous material 34 (in the direction of flow therethrough) is such as to provide a residence time to the hydrocarbon distillate of at least about 4 minutes or preferably longer. The cross section in a horizontal plane of the porous material 34 should be such that the velocity of the hydrocarbon distillate is reduced to a point that it does not cause compaction of the porous material 34 and thereby reduce its porosity unacceptably; and also, that the amount of water received into the inlet zone 33 per unit volume of the porous material 34 is not so great as to cause flooding of its open spaces to such an extent that the porous material 34 ceased to function in coalescing the water from the hydrocarbon distillate.

The mass of the porous material 34 rests upon a supporting member 36 which may be a wire-mesh having extensive openings so as to provide an insignificant pressure drop thereacross to the flow of hydrocarbon distillate. The flow of hydrocarbon distillate through openings in the porous material 34 produces a coalescence of the water droplets on exposed surfaces of the porous material 34. The dehydrated hydrocarbon distillate flows downwardly through the support 36 into an outlet zone 37 formed within the container 32. The dry hydrocarbon distillate is removed from the outlet zone 37 through an outlet 38 and a backpressure valve 39. In this manner, the contents of the electric coalesser 11 may be maintained under sufficient pressure that no free gas can be formed within the pretreatment cell 21 to cause an electrical short circuit in the interelectrode space 23 or possibly hazardous explosions.

The water coalesced on the porous material 34 is moved downwardly to be released as a loose mixture with the dry hydrocarbon distillate. The accumulated masses of coalesced water pass within the outlet zone 37 into a central portion guided by baffles 41 and 42. The water accumulates in a bulk phase 43 within the lower portion of the outlet zone 37 and is removed, under controlled conditions, through a motor valve 44 actuated by a float controller 46 by an interconnection indicated with chain line 47. Other means for controlling the removal of the bulk water 43 may be employed, if desired.

It will be apparent that the mass of the porous material 34 is adjusted in its volume relative to the amount of water and the amount of the hydrocarbon distillate passing from the pretreatment cell 21. In this regard, if the amount of water is relatively small, for example, 250 parts per million, the pretreatment cell 21 and the container 32 may be formed within a piece of pipe having a uniform diameter. However, where the amounts of water are relatively large, the fluid velocity should be maintained at some high level within the pretreatment cell 21 and then introduced at a proportionate reduced fluid velocity into an enlarged cross-sectional volume of the porous material 34 in the container 32 as was previously explained. In this regard, the dimensions of the pretreatment cell 21 and the container 32 including the porous material 34 can be tailored to a particular problem of coalescing dispersed water from a hydrocarbon distillate.

The utility of the electric coalescer 11 was tested in laboratory experiments to verify the great advantage in proper coaction between the electrical field of the pretreatment cell 21 and the function of the porous material 34 in optimum coalescing of dispersed water from a hydrocarbon distillate. For this purpose, an embodiment of the coalescer 11 was constructed from a vertical oriented 6 foot length of 2 inch diameter Plexiglass pipe. A pretreatment cell was formed in the upper portion of the pipe and consisted of a hollow rod electrode (which was packed with steel wool) spaced vertically at 7 inches above a mass of stainless steel wool which formed the porous material. A hydrocarbon distillate and dispersed water was passed downwardly via the rod electrode through the pipe by a centrifugal pump, reservoir and connecting conduits. A DC voltage power supply was connected to the energized rod electrode in the pretreatment cell to provide a desired gradient within the interelectrode space between the electrode and the inner walls of the pipe. The stainless steel wool in the lower portion of the pipe was grounded. Kerosene with dispersed water was circulated through the laboratory coalescer to stimulate a stable hazy hydrocarbon distillate-dispersed water mixture. The water was introduced in an amount of approximately 0.25 percent by volume into the suction side of the centrifugal charge pump which circulated the kerosene-water mixture downwardly through the pipe. The temperature within the coalescer was adjusted to be within 1° of room temperature to ensure equal evaluation of samples at reasonably similar treating conditions. The removal of water from the kerosene was evaluated by measuring the light transmission of the dry kerosene product in a Klette-Summerson photoelectric colorimeter. The coalesced water accumulated in the bottom of the pipe and a sidestream about four inches thereabove was the dry kerosene product. The light transmission readings were converted on an arbitrary scale into the haze appearance of the kerosene product. The readings of zero, 2, 4, 5, 6 and higher, correlate to haze appearances of sparkling, bright, clear, hazy, and very hazy appearances, respectively, of the wet kerosene sample. The kerosene-water mixture always had 6+ readings.

In the laboratory test of the electric coalescer, the energized rod electrode was 12 inches long and spaced 7 inches above a stainless steel wool pack. The pack had a length in the direction of flow of 16 inches and a density of about 10 pounds per cubic foot. The stainless steel was type 430 stainless steel wool, fine grade, and was used as obtained from the Brillo Corporation. The wool was composed of what appeared to be a continuous filament having a width of 0.009 inches and a thickness of 0.002 inches. Examination of the filament under a microscope disclosed that one edge was "saw tooth" in configuration. The filament appeared to be severed partially of its width on a bias, and such severed regions were spaced within a few thousands of an inch apart. Thus, the severed portions provided crevices of substantial extent in the filament and an extremely high-surface area exposed to fluids. It is believed that this surface area configuration provided for vast multitudes of coalescent sites for removing substantially all droplets of water from the kerosene.

In the first test, kerosene was introduced into the laboratory electric coalescer at rates suitable to provide a residence time in the steel wool of 4.0, 3.3, and 2.7 minutes. The gradient in the interelectrode space formed between the energized rod electrode and the inner pipe walls of the coalescer were varied from 16 to 32 kilovolts per inch (in 4 kilovolts increments). The data collected from this test is illustrated by the curves in FIGS. 2 and 3. In FIG. 2, Curve A is representative in the stainless steel wool of the 4 minute residence time condition, curve B is representative of the 3.3 minute residence time condition and curve C is time of the 2.7 minute residence time condition. Examination of these curves will clearly indicate that the ultimate removal of the dispersed water is a function in the coaction of the electric field in the pretreatment cell and the mass of the steel wool. For example, with a 4 minute residence time as indicated by curve A, the kerosene sample may be brought to a "bright" condition with a gradient of 20 kilovolts per inch in the pretreatment cell and a 4 minute residence time in the steel wool. As the residence time is reduced to 3.3 minutes as represented by curve B, the potential for producing a "bright" kerosene produce is increased to approximately 22 interelectrode kilovolts per inch gradient in the interelectrode space. Decreasing the residence time to 2.7 minutes requires the gradient to be increased to approximately 24 kilovolts per inch to produce the "bright" kerosene product. Thus, it is apparent that for any given rate and feed stock of kerosene with dispersed water, the gradient in the interelectrode space may be adjusted to produce a predetermined degree of removal of the dispersed water droplet.

The same laboratory test electric coalescer was employed to determine the relationship of the changes in the residence time of several masses of the stainless steel wool in the electric coalescer relative to a constant gradient of the unidirectional electric field within the interelectrode space of the pretreatment cell. In FIG. 3, there are illustrated curves A, B and C which are linear functions, namely straight lines. The electrode in the pretreatment cell was energized to a 20 kilovolt per inch gradient in the interelectrode space. The mass of the stainless steel wool was adjusted to provide an 8 inch depth of the steel wool for curve A, a 16 inch depth of the steel wool for curve B and a 32 inch depth of the steel wool for curve C. The equivalent residence time is listed for the three packs of steel wool A, B and C in correlation to the haze appearance of the product kerosene. Examination of the curves A, B and C indicates that as the rate of flow through the steel wool is increased for a given gradient in the interelectrode space, substantially the same residence time in the steel wool produces substantially identical kerosene product quality from the electric coalescer. For example, a residence time of approximately 4 minutes in each of the Curves A, B and C produces a "-bright" kerosene produce. Thus, the residence time of the kerosene in the steel wool may be adjusted for any given set of conditions to produce a predetermined degree of water removal from a kerosene sample. In as much as there is a fixed relationship between the electric field gradient in the interelectrode space and the residence time in the stainless steel wool, the pretreatment cell characteristics and the mass of the porous material can be correlated so as to provide a predetermined removal of dispersed aqueous liquid droplets from a hydrocarbon distillate.

A field pilot plant electric coalescer was constructed and tested on a kerosene stream. The pilot plant used a pretreatment cell formed of a cylindrical body, namely a two and one half inch steel pipe containing a steel rod electrode coaxially mounted therein, with approximately a one inch interelectrode space between the rod electrode and wall of the pipe. The rod electrode was approximately three foot in length and was spaced approximately six inches above the mass of the same stainless steel wool as employed in the preceeding described laboratory experiment. The kerosene flowed through the pretreatment cell directly into a vertically subtended pipe containing the stainless steel wool in a cylindrical pack 6 inches in diameter by 64 inches in length with a pack density of approximately 10 pounds per cubic foot. The agglomerated water and dry kerosene were phase separated into a water stream and a dry kerosene stream in a zone below the stainless steel wool. The kerosene stream was taken from a separator following a distillation column and contained an average water content of about 2,000 parts per million of suspended (dispersed) water in addition to a small amount of water soluble in the kerosene. Approximately 250 parts per million of water were believed to be soluble in the kerosene at the operating conditions. The pilot plant tests were conducted on the kerosene stream which was to be the feed stock for a copper chloride sweetening plant. As a result, the kerosene had various materials in it such as inhibitors, a small amount of napthenic acids and a large amount of mercaptans. The electrodes were not energized for two test runs so that no electric field was created within the interelectrode space of the pretreat electrode. Thereafter for three runs, the electrodes were energized to produce a unidirectional electric field in the interelectrode space with gradients of 20, 40 and 60 kilovolts per inch. A conventional high-voltage DC supply was used for this purpose. The rate of flow through the pilot plant electric coalescer was correlated to the residence time of the kerosene within the stainless steel wool. The wet-kerosene stream and the dry-kerosene stream from the electric coalescer were analyzed for the total amount of suspended water. The results of these tests are set forth in table I.

TABLE I

| Electric field (kilovolts per inch: | Rate (minutes) | Residence time | Suspended water (parts per million) Inlet | Outlet |
| --- | --- | --- | --- | --- |
| 0 | 3.3 | 2.3 | 1903 | 209 |
| 0 | 2.0 | 4.0 | 2021 | 84 |
| 20 | 2.0 | 4.0 | 1890 | 6 |
| 40 | 2.0 | 4.0 | 2000* | 9 |
| 60 | 2.0 | 4.0 | 2000* | 8 |

*estimated

It will be apparent that the stainless steel wool pack without the pretreatment cell containing an electric field could not remove to the optimum levels, the suspended water from the product kerosene. However, energizing the electrodes to produce an electric field with gradients in the interelectrode space in the range of from about 20 to about 60 kilovolts per inch removed the suspended water from approximately 2,000 parts per million to the outstanding low level of between 6 and 9 parts per million. Thus, the water content of the product kerosene was reduced by removal of substantially all possible suspended water leaving only the water-in-solution in the kerosene. It will be apparent that the function of the stainless steel wool in the first and second runs could reduce the water loading of any following salt dryer or the like from between about ⅛ to about 1/20th of their initial values. The coacting combination of the energized pretreatment cell and the steel wool pack reduced the water content in the dry kerosene to approximately 1/200th of the water content of the wet kerosene which was formerly carried directly into salt dryers and the like. The data clearly proves the outstanding results of the present combination of a coacting pretreatment cell and mass of porous material forming the electric coalescer of this invention.

In the preferred mode of arrangement of the electric coalescer as shown in FIG. 1, the rate of the incoming hydrocarbon distillate into the inlet 19 is determined and the porous material 34 is arranged so as to provide a resident time of at least about 4 minutes. Additionally, the mass of the porous material 34 must be able to coalesce the dispersed water from the hydrocarbon distillate without suffering flooding effects which reduce its coalescing ability. Then, the power supply 28 is arranged to provide an energizing potential to create a unidirectional electric field in the interelectrode space 23 with a gradient of at least 20 kilovolts per inch. Preferably, the gradient is adjusted so that the hydrocarbon distillate passing from the outlet 22 of pretreatment cell 21 into the inlet zone 33 of the container 32 is conditioned to that certain level where the porous material 34 produces an optimum coalescence of the dispersed water from the hydrocarbon distillate. For this purpose, the electric coalescer 11 may be operated at the desired rate of flow and the dry hydrocarbon removed through the outlet 38 is monitored while adjustments are made on the potential gradient in the interelectrode space. There will be a certain applied potential which will produce an optimum coalescence of the water in the porous material 34 for an optimum dryness in hydrocarbon distillate removed from the outlet 38. Under these conditions, the electric coalescer 11 is arranged for removing to a predetermined degree the water droplets dispersed in the hydrocarbon distillate and in some instances has been found even to remove some water which is soluble in the hydrocarbon distillate. Thus, the pretreatment cell 21 and the porous material 34 coact to produce the desired ultimate result.

Various modifications and alterations in the described electric coalescer will be apparent to those skilled in the art which do not depart from the spirit of the present invention. For this reason, these changes are desired to be included within the scope of the appended claims. The appended claims define the present invention; the foregoing description is to be employed for setting forth the present invention embodiments as illustrative in nature.

What is claimed is:

1. A coalescer for removing to a predetermined degree minute aqueous liquid droplets dispersed in a hydrocarbon distillate comprising:
   a. a pretreatment cell having first and second electrodes defining a vertically oriented interelectrode space therebetween with an upper inlet end and a lower outlet end, one of said electrodes being insulated from the other of said electrodes whereby a potential can be applied between said electrodes to create an electrical field within said interelectrode space;
   b. field establishing means connected to said electrode for maintaining a high voltage unidirectional electric field with a gradient in excess of about 20 kilovolts per inch in said interelectrode space;
   c. first means for continuously delivering to the inlet of said pretreatment cell a stream of said hydrocarbon distillate containing said dispersed droplets at a rate of flow sufficient to prevent accumulation of said dispersed droplets from said hydrocarbon distillates in said interelectrode space;
   d. a container having an upper inlet zone, an intermediate zone containing a porous material preferentially water wetted, and an outlet zone, said pretreatment cell integrally connected to said container with said lower outlet of said interelectrode space delivering downwardly all fluids therefrom directly into said upper inlet zone of said container, and said energized electrode of said pretreatment cell being spaced from the upper surface of said porous material in said container;
   e. said container mounting a mass of said porous material for providing a residence time to said hydrocarbon distillate sufficient to coact with said pretreatment cell to separate by coalescence the liquid droplets to the predetermined degree from said hydrocarbon distillate and discharge into said outlet zone a loose mixture of a continuous hydrocarbon distillate phase and a coalesced liquid droplet phase; and
   f. second means in said outlet zone of said container providing a dry hydrocarbon distillate stream and a second stream comprising the separate phase of the liquid droplets coalesced from said hydrocarbon distillate in said porous material.

2. The coalescer of claim 1 wherein said porous material provides a residence time to fluids exiting said interelectrode space of at least about 4 minutes.

3. The coalescer of claim 1 wherein said porous material is stainless steel wool.

4. The coalescer of claim 3 wherein said stainless steel wool has a packed density of about 10 pounds per cubic foot.

5. The coalescer of claim 1 wherein said field establishing means provides an electric field of a gradient sufficient to pretreat said fluids passing through the interelectrode space in that amount whereby said porous material produces an optimum removal of the dispersed droplets from said hydrocarbon distillate.

6. The coalescer of claim 5 wherein the field establishing means provides a gradient of said electric field within the range from about 20 to about 60 kilovolts per inch.

7. The coalescer of claim 1 wherein said pretreatment cell is formed of a cylindrical body which is mounted vertically above said container and a rod electrode carried coaxially in said body and insulated therefrom, and the length of said rod electrode to the annulus between the rod and body is greater than 8 to 1.

8. The coalescer of claim 7 wherein the field establishing means provides a gradient of said electric field within the range from about 20 to about 60 kilovolts per inch and said porous material is stainless steel wool.

9. The coalescer of claim 1 wherein the field establishing means provides an electric field between the lower end of said energized electrode and the upper surface of said porous material with a gradient of not above about 10 kilovolts per inch.

* * * * *

PO-1050
(5/69)

UNITED STATES PATENT OFFICE
CERTIFICATE OF CORRECTION

Patent No. 3,616,460          Dated October 26, 1971

Inventor(s) Frederick D. Watson & Weldon D. Mayse

It is certified that error appears in the above-identified patent and that said Letters Patent are hereby corrected as shown below:

Column 3, line 47, cancel "36" and substitute therefor---26---, and
Column 3, line 74, cancel "zOne" and substitute therefor---zone---;

Column 4, line 57, cancel "coalesser" and substitute therefor---coalescer---;

Column 6, line 8, cancel "time" (first occurrence) and substitute therefor---representative---;

Column 6, line 19, cancel "interelectrode"; and

Column 7, line 30 in the heading of Table I, under "Rate" cancel "(minutes)" and substitute therefor---(GPM)---, under "Residence Time" insert ---(minutes)---,.and the title "Inlet" should appear above the tabular column beginning with the numeral "1903".

Signed and sealed this 13th day of June 1972.

(SEAL)
Attest:

EDWARD M. FLETCHER, JR.
Attesting Officer

ROBERT GOTTSCHALK
Commissioner of Patents